United States Patent
Tonkin

(10) Patent No.: US 11,816,156 B2
(45) Date of Patent: *Nov. 14, 2023

(54) ONTOLOGY INDEX FOR CONTENT MAPPING

(71) Applicant: Semantic Technologies Pty Ltd., North Sydney (AU)

(72) Inventor: Albert Donald Tonkin, Seaforth (AU)

(73) Assignee: Semantic Technologies Pty Ltd., North Sydney (AU)

( * ) Notice: Subject to any disclaimer, the term of this patent is extended or adjusted under 35 U.S.C. 154(b) by 683 days.

This patent is subject to a terminal disclaimer.

(21) Appl. No.: 16/504,203

(22) Filed: Jul. 5, 2019

(65) Prior Publication Data

US 2019/0332630 A1 Oct. 31, 2019

Related U.S. Application Data

(63) Continuation of application No. 14/332,237, filed on Jul. 15, 2014, now Pat. No. 10,387,491.

(60) Provisional application No. 61/846,643, filed on Jul. 16, 2013.

(51) Int. Cl.
*G06F 16/30* (2019.01)
*G06F 16/84* (2019.01)
*G06F 16/36* (2019.01)

(52) U.S. Cl.
CPC ............ *G06F 16/86* (2019.01); *G06F 16/367* (2019.01)

(58) Field of Classification Search
CPC .............................. G06F 16/367; G06F 16/86
See application file for complete search history.

(56) References Cited

U.S. PATENT DOCUMENTS

| | | |
|---|---|---|
| 7,464,099 B2 | 12/2008 | Irons et al. |
| 7,730,098 B2 | 6/2010 | Lim |
| 7,779,039 B2 | 8/2010 | Weissman et al. |
| 8,010,567 B2 | 8/2011 | Subramanyam et al. |
| 8,041,702 B2 | 10/2011 | Eggebraaten |
| 8,495,042 B2 | 7/2013 | Symington |
| 8,799,265 B2 | 8/2014 | Johnson |
| 8,838,628 B2 | 9/2014 | Leighton |
| 2005/0223022 A1* | 10/2005 | Weissman ............ G06F 16/289 707/999.102 |
| 2007/0226246 A1* | 9/2007 | Dheap ................. G06F 16/2365 707/999.102 |
| 2008/0215542 A1* | 9/2008 | Lim .................... G06F 16/2433 |

(Continued)

OTHER PUBLICATIONS

Article entitled "PowerAqua: A Multi-Ontology Based Question Answering System—v1", by Lopez et al., dated 2007 (Year: 2007).*

(Continued)

*Primary Examiner* — Mahesh H Dwivedi
(74) *Attorney, Agent, or Firm* — Honigman LLP

(57) ABSTRACT

A method of generating an ontology index for use in mapping content fields to ontology terms from one or more ontologies, the method including, in an electronic processing device, selecting one or more ontologies, each ontology including a number of ontology terms, determining an ontology term meaning for at least some of the ontology terms and generating an index including index terms indicative of the ontology terms, wherein the index identifies ontology terms having equivalent ontology term meanings.

17 Claims, 9 Drawing Sheets

(56) References Cited

U.S. PATENT DOCUMENTS

| | | | |
|---|---|---|---|
| 2008/0307523 A1* | 12/2008 | Subramanyam | G06F 16/36 726/21 |
| 2009/0112838 A1 | 4/2009 | Eggebraaten | |
| 2011/0047169 A1* | 2/2011 | Leighton | G16Z 99/00 707/E17.014 |
| 2011/0078205 A1* | 3/2011 | Salkeld | G06F 16/3344 707/794 |
| 2011/0099184 A1 | 4/2011 | Symington | |
| 2012/0023104 A1 | 1/2012 | Johnson | |
| 2012/0330974 A1* | 12/2012 | Zillner | G06N 5/02 707/E17.044 |
| 2013/0054621 A1* | 2/2013 | Kretz | G06N 5/022 707/758 |

OTHER PUBLICATIONS

Article entitled "Semantic Similarity Search on Semistructured Data with the XXL Search Engine", by Schenkel et al., dated 2005 (Year: 2005).*

Article entitled "ADANS: An Agriculture Domain Question Answering System Using Ontologies", Copyright 2017, by Devi et al.

Article entitled PowerAqua: A Multi-Ontology Based Question Answering System—v1, dated 2007, by Lopez et al.

* cited by examiner

ONTOLOGY INDEX FOR CONTENT MAPPING

CLAIM OF PRIORITY

This application claims priority to U.S. patent application Ser. No. 14/332,237, filed Jul. 15, 2014, which claims priority to U.S. Provisional Application No. 61/846,643, filed Jul. 16, 2013, each of which is incorporated by reference in its entirety.

BACKGROUND OF THE INVENTION

The present invention relates to a method and apparatus of generating an ontology index for use in mapping content fields to ontology terms from one or more ontologies and a method and apparatus of using an ontology index for mapping content fields to ontology terms from one or more ontologies.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

In recent years there has been a major move to the concept of 'big data', which is effectively unstructured data that is textually indexed and can be searched using a number of proprietary search tools. Currently the data is primarily machine logs and social data (twitter, facebook, email, blogs etc). The indexes are described as 'deep indexing' as they index every character and every word of the data. The indexes are then used to construct a 'schema on the fly'.

Whilst, queries against such data can be used to transform the data and perform time-based analysis, there are often difficulties associated with the data being indexed differently in different repositories. This ad-hoc nature of the indexing makes it difficult to integrate and meaningfully analyse data from different data sources.

Whilst techniques have been provided to allow data to be transferred between different formats and/or structures, these typically involve using flat files having various bespoke record formats. Whilst metadata describing these files should be contained in program data descriptors, the metadata is frequently unavailable or inaccurate, meaning such files are of little use. Data is also often stored in databases, such as relational, networked and hierarchical databases. These have metadata stored by the database management software (DBMS) which is bespoke to each different DBMS. In the case of relational databases whilst the metadata can be extracted if the metadata format is known, typically this is not the case and manual processes are required to analyse and transfer data.

A further characteristic of both forms of data is their inflexibility, meaning adding a new attribute to a recorded entity is complex and time consuming. Consequently the data integrity is often poorly managed, with there being few, if any, generic standards specifying in which format data should be stored, and the intended meaning of the data. Furthermore, data of different sources typically has different metadata meaning it is difficult to transfer data accurately between the sources.

The net effect of this ambiguity has been the need to create massive metadata repositories or data dictionaries, so that the data could be mapped between two locations. The creation and maintenance of these repositories represents a ongoing cost to organisations and is therefore undesirable.

US-2006/0112110 describes a system, method and program product for normalising, sanitising and disambiguating structured data. Structured data includes data stored in a database management system (DBMA), as well labelled files (e.g., XML data). An automated data enhancement processing system is provided, comprising: a system for ingesting data structured in at least one predefined database format; and a set of text analytics processes that treat the ingested data as unstructured, and generate normalised data represented and indexed by consistent, structured metadata.

In this regard, normal forms (NF) of relational database theory provide criteria for determining a table's degree of vulnerability to logical inconsistencies and anomalies. The higher the normal form applicable to a table, the less vulnerable it is. Each table has a "highest normal form" (HNF): by definition, a table always meets the requirements of its HNF and of all normal forms lower than its HNF. Also by definition, a table fails to meet the requirements of any normal form higher than its HNF.

The above describes process therefore attempts to normalise generated schemas to at least $3^{rd}$ normal form, which greatly simplifies the ability to map to a known schema. However, this is still of only limited use, and much modern data is at least partially unstructured meaning it cannot be normalised in the traditional sense of normalising data attributes, making the applicability of this process limited.

Recently, collections of database and other schemas have been combined to form ontologies. An example of this is the formation of ontologies for medical records, which use various standards to give rigorous definitions to medical terms, procedures and analytical artefacts such as x-rays, MRI scans, blood analysis and so on.

Creating such ontologies requires the definition, organisation, visualisation, and utilisation of semantic spaces created from biomedical knowledge processing applications. Common components of ontologies include:

Individuals: instances or objects (the basic or "ground level" objects). Such objects are easily normalised to 3rd normal form.

Classes: sets, collections, concepts, classes in programming, types of objects, or kinds of things. Such objects can potentially be normalised to 5th normal form.

Attributes: aspects, properties, features, characteristics, or parameters that objects (and classes) can have. Such objects can potentially be normalised to 5th normal form.

Relations: ways in which classes and individuals can be related to one another. Such objects can potentially be normalised to 5th normal form.

Function terms: complex structures formed from certain relations that can be used in place of an individual term in a statement Restrictions: formally stated descriptions of what must be true in order for some assertion to be accepted as input. Such aspects cannot be captured in relational or XSD terms.

Rules: statements in the form of an if-then (antecedent-consequent) sentence that describe the logical inferences that can be drawn from an assertion in a particular form. Rule statements are outside all existing schema definitions Axioms: assertions (including rules) in a logical form that together comprise the overall theory that the ontology describes in its domain of application. This definition differs from that of "axioms" in generative grammar and formal logic. In those disciplines, axioms include only statements asserted as a priori knowledge. As used here, "axioms" also include the theory derived from axiomatic statements Axioms are outside all existing schema definitions Events: the changing of attributes or relations. Events are typically modelled in a relational schema. As such they can potentially be described in 3rd normal form.

Building these ontologies required a new language RDF (Resource Description Framework), which was based on XML (eXtensible Mark-up Language) and has evolved into a number of XML-like languages such as Turtle, N3 and OWL (Web Ontology Language), with the ability to define multiple related sets of data distributed over many locations. Whilst there are tools for the generation of XML schema (XSD) from relational databases, there are no mechanisms for identifying XSDs that apply to different data sources or are able to accurately map between database having different formats. Even matching data using an ontology is difficult and time consuming as each semantic meaning would need to be examined to ensure accurate mapping.

U.S. Pat. No. 7,464,099 provides a method of transferring content from a file and a database. In this case, the file includes content instances, each content instance being associated with a respective field, and each field having a respective type. The transfer is achieved by determining the type of each field, and then storing each content instance in a store in accordance with the determined field type of the associated field. Each content instance can then be transferred to the database in accordance with the determined field type. A similar procedure is provided for creating XML files based on content within the database.

SUMMARY OF THE PRESENT INVENTION

In a first broad form the present invention seeks to provide a method of generating an ontology index for use in mapping content fields to ontology terms from one or more ontologies, the method including, in an electronic processing device:
 a) selecting one or more ontologies, each ontology including a number of ontology terms;
 b) determining an ontology term meaning for at least some of the ontology terms; and,
 c) generating an index including index terms indicative of the ontology terms, wherein the index identifies ontology terms having equivalent ontology term meanings.

Typically the method includes, in an electronic processing device, determining the ontology term meaning using at least one of:
 a) an ontology term name;
 b) ontology term keywords; and,
 c) an ontology term definition.

Typically each index term is associated with a corresponding ontology term.

Typically the method includes, in an electronic processing device:
 a) assigning a unique identifier to each different ontology term meaning; and,
 b) determining a respective identifier for each index term in accordance with the ontology term meaning of the corresponding ontology term.

Typically at least some index terms have the same respective identifier.

Typically each index term includes:
 a) an identifier indicative of the ontology term meaning of a corresponding ontology term;
 b) an indication of the ontology containing the corresponding ontology term; and,
 c) an indication of an ontology term type of the corresponding ontology term.

Typically each ontology term has an ontology term type, the ontology term type being at least one of an ontology class and an ontology property.

In a second broad form the present invention seeks to provide apparatus for generating an ontology index for use in mapping content fields to ontology terms from one or more ontologies, the apparatus including a processing system having an electronic processing device that:
 a) selects one or more ontologies, each ontology including a number of ontology terms;
 b) determines an ontology term meaning for at least some of the ontology terms; and,
 c) generates an index including index terms indicative of the ontology terms, wherein the index identifies ontology terms having equivalent ontology term meanings.

In a third broad form the present invention seeks to provide a method of using an ontology index for mapping content fields to ontology terms from one or more ontologies, the ontology index including index terms indicative of the ontology terms, the method including, in an electronic processing device:
 a) determining a content field name of a content field;
 b) selecting at least one index term from the ontology index at least partially in accordance with the content field name; and,
 c) using the at least one index term to map the content field to an associated ontology term.

Typically the method includes, in an electronic processing device:
 a) determining a content field meaning associated with the content field name; and,
 b) determining at least one index term at least partially using the content field meaning.

Typically the method includes, in an electronic processing device:
 a) determining a respective identifier using the content field meaning; and,
 b) selecting at least one index term using the respective identifier.

Typically each index term is associated with a corresponding ontology term and index terms having corresponding ontology terms with equivalent meanings are assigned the same identifier, wherein the method includes, in an electronic processing device:
 a) determining each index item having the respective identifier; and,
 b) determining the ontology terms using each index item.

Typically at least some index terms have the same respective identifier.

Typically the method includes, in an electronic processing device, for at least one content field, determining a plurality of associated ontology terms.

Typically the method includes, in an electronic processing device:
 a) determining a plurality of ontology terms using the at least one index term; and
 b) selecting the associated ontology term from the plurality of ontology terms.

Typically the method includes, in an electronic processing device, selecting the associated ontology term at least one of:
a) using a ranking process; and,
b) by excluding conflicting ontology terms; and,
c) by excluding ontology terms from conflicting ontologies;
d) based on a content field type of the content field and ontology term types of the ontology terms.

Typically the method includes, in an electronic processing device:
a) determining a plurality of ontology terms associated with a number of related content fields; and,
b) excluding ontology terms that cannot be used to relate the content fields.

Typically the ranking process includes:
a) determining the percentage of ontology terms that match content field; and,
b) weighting factors.

Typically the method includes, in an electronic processing device, selecting the associated ontology term to preserve relationships between the content fields.

Typically each index term includes:
a) an identifier indicative of the meaning of the respective ontology term;
b) an indication of the ontology containing the respective ontology term; and,
c) an indication of an ontology term type of the respective ontology term.

Typically the method includes, in an electronic processing device, selecting one of a plurality of ontology indexes in accordance with a subject matter of the content.

Typically each ontology term has an ontology term type, the ontology term type being at least one of an ontology class and an ontology property.

Typically the content fields are at least one of database fields and file fields.

Typically the method includes, in an electronic processing device, transferring content to a target or from a source using the mapping.

Typically the method includes, in an electronic processing device, transferring content associated with the content field at least partially in accordance with the associated ontology term.

Typically the method includes, in an electronic processing device, storing the content in a store field of a store, wherein the store field has a store field determined in accordance with the associated ontology term.

Typically the method includes, in an electronic processing device, creating the store in a memory of a processing system.

Typically the method includes, in an electronic processing device:
a) determining an ontology term associated with each of a number of content instances to be transferred to a target;
b) storing each of the content instances in the store fields of the store in accordance with the ontology term; and,
c) transferring each of the content instance to target content fields in the target using the ontology term and the ontology index.

Typically the method includes, in an electronic processing device:
a) determining an ontology term associated with each of a number of content instances to be transferred from a source; and,
b) storing each of the content instances in the store fields of the store in accordance with the ontology term and the ontology index.

In a fourth broad form the present invention seeks to provide apparatus for using an ontology index for mapping content fields to ontology terms from one or more ontologies, the ontology index including index terms indicative of the ontology terms, the apparatus including a processing system having an electronic processing device that:
a) determines a content field name of a content field;
b) selects at least one index term from the ontology index at least partially in accordance with the content field name; and,
c) uses the at least one index term to map the content field to an associated ontology term.

In a fifth broad form the present invention seeks to provide a method of extracting content instances from a source database, each content instance being stored in a source database field having a source database field type, the method including in an electronic processing device, for at least one content instance to be extracted:
a) determining the source database field type of the source database field in which the content instance is stored;
b) determining an ontology term associated with the content instance using the source database field type and an ontology index that maps source database field types to respective ontology terms; and,
c) storing the content instance in at least one of a file and a store in accordance with the associated ontology term.

Typically the method includes storing the content instance in a store field of a store, wherein the store field has a store field type determined in accordance with the associated ontology term.

Typically the method includes storing the content instance in a file field of a file, wherein the file field has a file field type determined in accordance with the associated ontology term.

Typically the method includes:
a) storing the content instance in a store field of a store; and,
b) transferring the content instance from the store field to a file field, and wherein the file field has a file field type determined in accordance with the associated ontology term.

Typically the method includes creating store fields in a store in accordance with the ontology terms associated with the source database field types of each content instance to be extracted.

Typically the method includes:
a) determining a number of content instances to be extracted; and
b) creating store fields in a store in accordance with the determined number.

Typically the method includes:
a) determining each of the source database field types from source database metadata defining the source database field types; and,
b) comparing each source database field type to the ontology index to thereby at least partially determine an ontology term associated with each source database field type.

Typically the method includes selecting one of a plurality of existing ontology indexes using at least one of the source database field types.

Typically the method includes:
a) comparing at least one source database field type to the plurality of ontology indexes; and,
b) selecting the ontology index in accordance with the results of the comparison.

Typically the method includes, for any source database field types not having an associated ontology term in the index:
a) displaying an indication of the source database field and a plurality of ontology terms to a user;
b) determining an association between an ontology term and a source database field type in accordance with input commands from the user; and,
c) updating the ontology index in accordance with the determined association.

Typically the method includes:
a) retrieving a content instance for a parent node from a source database field of the source database;
b) storing the content instance in a store field;
c) retrieving a content instance for each child node of the parent node from a source database field of the source database; and,
d) storing each content instance in a respective store field.

Typically the method includes, transferring content instances for a parent node and each child node of the parent node from the store to file fields in a file.

Typically the method includes:
a) transferring a next query to the source database;
b) receiving at least one report from the source database;
c) determining a number of content instances in the at least one report; and,
d) creating store fields in the data store in accordance with a number of content instances in the at least one report.

Typically the method includes, transferring the content instances from the at least one report to the store fields in the store.

Typically the method includes transferring each content instance to the store using a respective query, the query being determined at least partially in accordance with the source database field type.

Typically the query is an SQL query.

Typically the method includes:
a) creating the query including one or more vacant locations;
b) applying the query to the source database to thereby transfer each content instance into a respective vacant location.

Typically the method is for transferring content between a source database and a mark-up language file.

Typically the mark-up language file is an RDF/XML file.

Typically each content instance is stored as a respective node in a corresponding file field of the file.

Typically the manipulations are performed as content instances are stored in the store.

Typically the manipulations include at least one of combining and splitting content instances.

Typically the method includes, storing the content instances in a file in accordance with the ontology term associated with each content instance, and transferring the content instances from the file to a target database in accordance with a second ontology index that maps ontology terms to target database fields.

Typically the method includes:
a) determining an ontology term associated with the content instance using the file field type of the file field in which the content instance is stored;
b) determining a target database field type using the ontology term and using a second ontology index that maps the target database field types to respective ontology terms; and,
c) storing the content instance in a target database field of the target database in accordance with the determined database field type.

Typically the method includes:
a) storing the content instance in a store field of a store, the store field having a store field type determined in accordance with the associated ontology term; and,
b) transferring the content instance from the store field to the target database field.

Typically the method includes creating store fields in accordance with the ontology terms associated with the content instance.

Typically the method includes:
a) determining a number of content instances to be transferred; and
b) creating store fields in accordance with the determined number.

Typically the method includes:
a) determining the ontology terms of the content instances to be stored in the target database; and,
b) comparing each ontology term to the second ontology index to thereby at least partially determine a target database field type associated with each ontology term.

Typically the method includes determining the second ontology index by selecting one of a plurality of existing ontology indexes using at least one of the target database field types.

Typically the method includes:
a) comparing at least one target database field type to the plurality of existing ontology indexes; and,
b) selecting the second ontology index in accordance with the results of the comparison.

Typically the method includes, for any target database field types not having an associated ontology term in the index:
a) displaying an indication of the target database field and a plurality of ontology terms to a user;
b) determining an association between an ontology term and a target database field type in accordance with input commands from the user; and,
c) updating the second ontology index in accordance with the determined association.

Typically the method includes:
a) retrieving a content instance for a parent node from a file field of the file;
b) storing the content instance in a store field of a store;
c) retrieving a content instance for each child node of the parent node from a file field of the file; and,
d) storing each content instance in a respective store field.

Typically the method includes of storing content in the database by:
a) creating one or more vacant locations in a query in accordance with the database field type of the database fields in which content instances are to be stored;
b) transferring each content instance into a respective vacant location; and,
c) applying the query to the database to thereby transfer the content instance(s) to the database in accordance with the database field type.

Typically the query is an SQL query.

Typically the method is for transferring content between a mark-up language file and a target database.

Typically the mark-up language file is an RDF/XML file.

Typically the manipulations are performed as content instances are stored in or retrieved from the store.

Typically the manipulations include at least one of combining and splitting content instances.

In a sixth broad form the present invention seeks to provide apparatus for extracting content instances from a source database, each content instance being stored in a source database field having a source database field type, the apparatus including, an electronic processing device of a processing system that, for at least one content instance to be extracted:
 a) determines the source database field type of the source database field in which the content instance is stored;
 b) determines an ontology term associated with the content instance using the source database field type and an ontology index that maps source database field types to respective ontology terms; and,
 c) stores the content instance in at least one of a file and a store in accordance with the associated ontology term.

In a seventh broad form the present invention seeks to provide a method of transferring a content instance from a file to a target database, each content instance being stored in a file field having a file field type, the method including, in an electronic processing device:
 a) determining an ontology term associated with the content instance using the file field type of the file field in which the content instance is stored;
 b) determining a target database field type using the ontology term and using a second ontology index that maps the target database field types to respective ontology terms; and,
 c) storing the content instance in a target database field of the target database in accordance with the determined database field type.

In an eighth broad form the present invention seeks to provide apparatus for transferring a content instance from a file to a target database, each content instance being stored in a file field having a file field type, the apparatus including an electronic processing device of a processing system including:
 a) determining an ontology term associated with the content instance using the file field type of the file field in which the content instance is stored;
 b) determining a target database field type using the ontology term and using a second ontology index that maps the target database field types to respective ontology terms; and,
 c) storing the content instance in a target database field of the target database in accordance with the determined database field type.

It will be appreciated that the broad forms of the invention can be used independently or in conjunction, depending on the preferred implementation.

BRIEF DESCRIPTION OF THE DRAWINGS

An example of the present invention will now be described with reference to the accompanying drawings, in which:—

DETAILED DESCRIPTION OF THE PREFERRED EMBODIMENTS

Figure 1A:
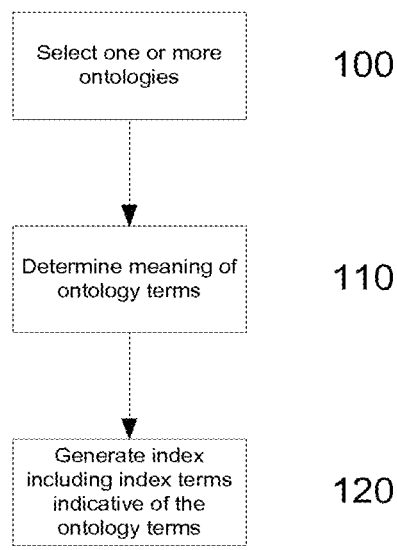
FIG. 1A is a flow chart of an example of a method of generating an ontology index for use in mapping content fields to ontology terms from one or more ontologies.

An example of a method of generating an ontology index for use in mapping content fields to ontology terms from one or more ontologies will now be described with reference to FIG. 1A.

For the purpose of this example, it is assumed that the process is performed at least in part using an electronic processing device, such as a microprocessor of a computer system, as will be described in more detail below.

It is also assumed that content is stored as one or more content instances in content fields of a content repository, such as database or file. Thus, the content fields could be database fields of a database, with a content instance corresponding to a database record, including values stored across multiple database fields. Alternatively, content fields could be fields defined within a file, such as an XML file, which may be used for transporting data, for example, when data is to be extracted from and/or transferred to a database, as will become apparent from the description below.

For the purpose of illustration throughout the following description, the term "source" is used to refer to a database or file from which data is being extracted, whilst the term "target" is used to refer to a database or file into which data is being stored. These terms are for the purpose of illustration only, for example to distinguish between possible sources and targets, and are not intended to be limiting.

The term "content instance" refers to an individual piece of content that is being extracted from a source and/or transferred to a target and is also not intended to be limiting. For example the term content instance could refer to a database record having values stored in a number of different database fields, or could alternatively refer to a single value stored within a single field.

Additionally, the term "ontology" is intended to refer to a collection of schemas relating to a particular domain. Ontologies typically include a number of components such as individuals, classes, attributes or the like and the term "ontology terms" is generally used to refer to specific ones of these components.

The term "meaning" is intended to refer to the semantic interpretation of a particular ontology term, content field name, or the like. The term meaning therefore encompasses the intended meaning of the ontology term or content field, for example to account for issues such as homonyms, synonyms, or the like, as will be described in more detail below.

In this example, at step 100 the electronic processing device is used to select one or more ontologies. This process is typically performed by examining domains of a number of ontologies and selecting domains, and hence ontologies that are of relevance to a particular subject matter field of the content, the industry to which the content relates, or the like. Selection of the ontologies can be automated, for example by providing the electronic processing device with an indication of the subject matter field of the relevant content; manual, for example by having the electronic processing device display details of available ontologies allowing the user to select these, or through a combination of manual and automated processes.

At step 110, the electronic processing device determines meanings of ontology terms within the selected one or more ontologies. The meaning is typically derived from either a name of the ontology term, or associated ontology term keywords or definitions. This process is typically performed substantially automatically by having the electronic processing device convert names or definitions into a controlled vocabulary, which can then be used to represent the meaning, as will be described in more detail below.

At step 120 the electronic processing device operates to generate an index including index terms indicative of the ontology terms. The index is generated so as to reflect ontology terms having equivalent ontology term meanings, thereby allowing a meaning associated with content fields to be compared to the ontology index to thereby readily ascertain one or more ontology terms that are relevant to the particular meaning. The index terms can be generated in any one of a number of ways, such as by generating a single index entry for each ontology term having the same meaning, although more typically a respective index entry is defined for each ontology term, with index entries for ontology terms having equivalent meanings being linked in some way.

In general, the ontology index will include a large number of entries, typically hundreds of thousands depending on the number of ontologies used and their intended purpose, and accordingly the index is preferably generated as a sparse index, including only minimal information, thereby allowing for rapid comparison of content fields to the index, as will be described in more detail below.

The ability to build an ontology index spanning across one or more ontologies provides a powerful mechanism for allowing the meaning of content associated with different content fields to be uniquely defined throughout an industry or subject matter field. Consequently, the ontology index allows content fields to be mapped to a controlled vocabulary defined using ontology terms, thereby ensuring the meaning of the content is understood consistently. This in turn allows content to be transferred between sources and targets, even if these have completely different schemas, field definitions, or the like and which therefore cannot otherwise be easily mapped. In particular, this allows the meaning of any source fields to be translated into ontology terms, and from there to target fields, so that the ontology terms represent a common point of reference between sources and targets having different database schemes.

Thus, the ontologies and the index enable semantic interoperability between datasets from multiple sources. Semantic interoperability refers to the ability of computer systems to transmit data with unambiguous, shared meaning. Semantic interoperability is a requirement to enable machine computable logic, inference, knowledge discovery, and data federation between information systems. Semantic interoperability is therefore concerned not just with the packaging of data (syntax), but the simultaneous transmission of the meaning with the data (semantics).

In one example, the resulting index is in many senses a naïve index in that many of the terms are used in a loosely defined fashion, with the totality of the terms matched that provides a degree of sophistication.

Figure 1B:
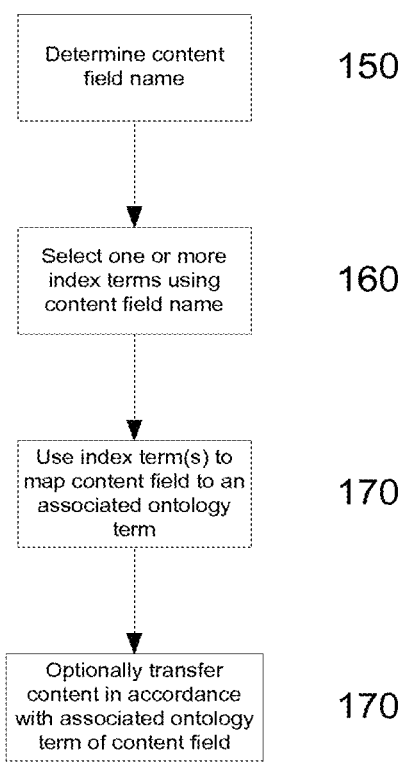
FIG. 1B is a flow chart of an example of a method of using an ontology index for mapping content fields to ontology terms from one or more ontologies.

An example of the method of using an ontology index for mapping content fields to ontology terms from one or more ontologies will now be described with more reference to FIG. 1B.

In this example, at step 150 the electronic processing device determines a content field name. The manner in which this is achieved will depend upon the preferred implementation and the nature of the content repository in which the content is stored. For example, if content is stored in a database this can involve accessing database metadata, or alternatively querying the database, in order to ascertain content field names associated with different fields within the database. Similarly, in the case in which content is stored in a file this can include examining a document type definition (DTD), schema or the like, which defines content field names associated with different fields within the file.

At step 160, the electronic processing device selects one or more index terms using the content field name. Typically this is achieved by having the electronic processing device determine a meaning associated with the content field name, for example by translating the name into a controlled vocabulary, and then using this to identify one or more index terms relevant to the respective meaning, although any suitable technique can be used.

At step 170, the index terms are then utilized to map the content field to an associated ontology term. Thus, this process typically involves having the electronic processing device identify one or more index terms associated with the determined meanings of the content field, and then use the one or more index terms to identify associated ontology terms, which may be from one or more different ontologies.

It will be appreciated that if only a single ontology term exists for any given meaning, then the electronic processing device will typically only identify a single index term and corresponding ontology term. However, because the index usually relates to more than one ontology, more typically a number of ontology terms across a number of different ontologies are identified that could be used. For example, the electronic processing device could identify a single index term corresponding to multiple ontology terms, or could involve identifying one or more index terms, each having a respective ontology term.

In this case, once a number of different ontology terms have been identified, the electronic processing device may perform further analysis to select one of the ontology terms as the ontology term to be associated with the content field. This could be performed manually in accordance with a user input selection, and/or could involve automated analysis for example by analysing criteria or rules for selecting the ontology term, as will be described in more detail below.

In particular, this is generally performed so as to preserve relationships within the source or target. For example, if content fields are related, corresponding relationships should be defined within a relevant ontology. In this example, by mapping the content fields to those ontology terms, the relationship is automatically maintained by virtue of the relationship between the ontology terms.

In one example, it may be desirable to determine two ontology terms for a given database field, the two ontology terms being in different ontologies. This can be used to preserve relationships between content fields that only have associated ontology terms in different ontologies. So, for example, if three fields are in two different ontologies, one of the fields may be associated with ontology terms in two of the ontologies to thereby maintain the relationship with both of the other content fields.

Once an associated ontology term has been identified for a content field, this can then optionally be used to transfer content from/to a source/target at step 180. Thus, for example, the electronic processing device can extract content from a source database, and store this in a data store or file, for example in a store field or file field which is associated with the respective ontology terms. This then allows the data to be transferred to a target database, for example by mapping the ontology term to a target database field defined in the target database schema, using a method similar to that described above.

Accordingly, it will be appreciated that the index allows content to be associated with ontology terms, based on the meaning of the content or content fields within which the content is stored or is to be stored. This in turn allows content to be transferred between databases or other content repositories having different schemas, by mapping the content fields of each schema to common ontology terms using the index.

Furthermore, by appropriate selection of the ontology terms, this allows relationships between the content fields to be maintained based on relationships within the ontology, which can be implemented to ensure relationships are correctly mapped to databases with different schemas.

A number of further features will now be described.

In one example, as briefly mentioned above, the electronic processing device usually defines the ontology term meaning using at least one of the ontology term name, ontology term key words and an ontology term definition. As part of this process, the electronic processing device typically performs processing on any keywords in order to identify synonyms, homonyms or the like.

In one example each index term is associated with a corresponding ontology term. Accordingly, it will be appreciated that this leads to a situations in which multiple index terms can be associated with a common ontology term meaning, for example if ontology terms across a number of different ontologies have equivalent meanings.

In one example, the electronic processing device determines a unique identifier for each different ontology term meaning and determines a respective identifier for each index term in accordance with the ontology term meaning of the corresponding ontology term. Thus, the ontology term meaning is represented in the form of a unique identifier, such as an alpha-numeric string, such as a "name value key" (NVK), as will be described in more detail below. By translating the meaning into a unique identifier, this provides a mechanism for rapidly identifying index terms having a given meaning. Thus, for example, when accessing content from a particular content field, the meaning of the content field can be used to determine the identifier associated with the respective meaning, allowing a simple look up process to be used to identify relevant index terms having the same identifier.

It will be appreciated based on this that each index term typically includes an identifier, such as an NVK, indicative of the ontology term meaning of a corresponding ontology. The index term will also typically include an indication of the ontology containing the respective ontology term as well as an indication of an ontology term type such as an ontology class or an ontology property. It will be appreciated that other ontology components could be used as the ontology term, however in general, most scenarios can be resolved solely on the basis of ontology classes or ontology properties and this therefore operates to provide a reduced index making this easier to search and use.

When using the ontology index to map content fields to ontology terms, the electronic processing device typically determines a content field meaning associated with the content field name and then determines the index term at least partially using the content field meaning. In particular, when identifiers such as NVKs have been used in the ontology index, the electronic processing device typically determines a respective NVK using the content field name, and then selects at least one index term using the NVK.

As mentioned above, each index term may be associated with a corresponding ontology term with index terms having corresponding ontology terms with equivalent meanings being assigned to the same identifier. In this example, the electronic processing device determines each index item having a respective identifier and then determines the ontology terms using each index item. This leads to the electronic processing device determining a number of potential ontology terms that could be associated with the content field and the electronic processing device therefore selects one of these as the ontology term that is to be associated with the content field.

The selection of one of a number of ontology terms may be achieved using any appropriate technique but typically involves at least one of a mapping process, a ranking process, exclusion of conflicting ontology terms, exclusion of ontology terms from conflicting ontologies, or the use of a content field type and ontology term type. Thus, for example, if the content field relates to a property then the electronic processing device will select an ontology term that relates to an ontology property in preference to an ontology term that relates to an ontology class.

As previously mentioned, in some examples, content fields can be mapped to two or more ontology terms, typically contained in different ontologies, thereby allowing relationships between different content fields to be reflected in the mapping.

In one example this process involves determining a plurality of ontology terms associated with a number of related content fields, and then excluding ontology terms that cannot be used to relate the content fields, as will be described in more detail below. As mentioned above, a ranking process may also be used which examines the percentage of ontology terms that map content fields for the respective database, together with weighting factors, to ascertain the ontology terms that should be used. Thus, for example, if potential ontology terms for the content fields are distributed with most of these being in first and second ontologies, with very few being in a third ontology, ontology terms from the third ontology may be excluded where possible.

The above described process can be used to construct a number of ontology indexes for a variety of different subject matter fields, such as different industries. This allows the electronic processing device to select one of a plurality of ontology indexes in accordance with the subject matter of the content. Thus, for example, an ontology index could be constructed for the health care industry whilst a separate ontology index may be constructed for customer relations management (CRM) applications. It will be appreciated that there may be overlaps in the ontologies, and optionally the ontology indexes, between the different industries.

As mentioned above, this process can be used for transferring content to a target or from a source. In this example the content fields are typically database fields and/or file fields although this is not essential. The electronic processing device transfers the content via a content field at least partially in accordance with the associated ontology term. This process can include exporting data from a source database having a source database schema into a file, where the content is stored in a file field having a file field name based on the associated ontology term. This allows the content to be interpreted by other third party applications as required, for example allowing the content to be transferred to a second database having a second database schema different to the first database schema. Thus, the ontology terms represent a controlled vocabulary that can be used in order to transfer data between databases having different database schemas.

In one example, the process involves storing content in a store field of a store, wherein the store field of the store has a store field name based on the associated ontology term. The store may be created in a memory of a processing system containing the electronic processing device, so that content can be transferred from a database into the store in memory, and then subsequently transferred to a file.

The ability to store data in an intermediate store when it is being transferred from a database to a file, vice versa or between a file and a file and a database and a database, allows manipulation of content to be performed. In particular, the process typically involves selecting all content of interest and transferring this from the database into the store in a single operation. The data can then be manipulated before being transferred on to a file or other database as required. For example, a name may be stored in a source as a first name and separately a last name, whilst a target uses a single name field for the entire name. In this instance, if all content instances containing names are transferred into the store, these can then easily be combined, for example by combining fields, allowing these to be more easily transferred into the target.

Accordingly, the process typically involves having the electronic processing device determine an ontology term associated with each of a number of content instances to be transferred to a target, storing the content instances in store fields for storing in accordance with the ontology term and then transferring each of the content instances to target content fields in the target using the ontology term in the ontology index. Conversely when extracting data from a source this typically involves determining an ontology term associated with each of a number of content instances to be transferred from a source and then storing each of the content instances in the store fields of a store in accordance with the ontology term and the ontology index.

Figure 2:
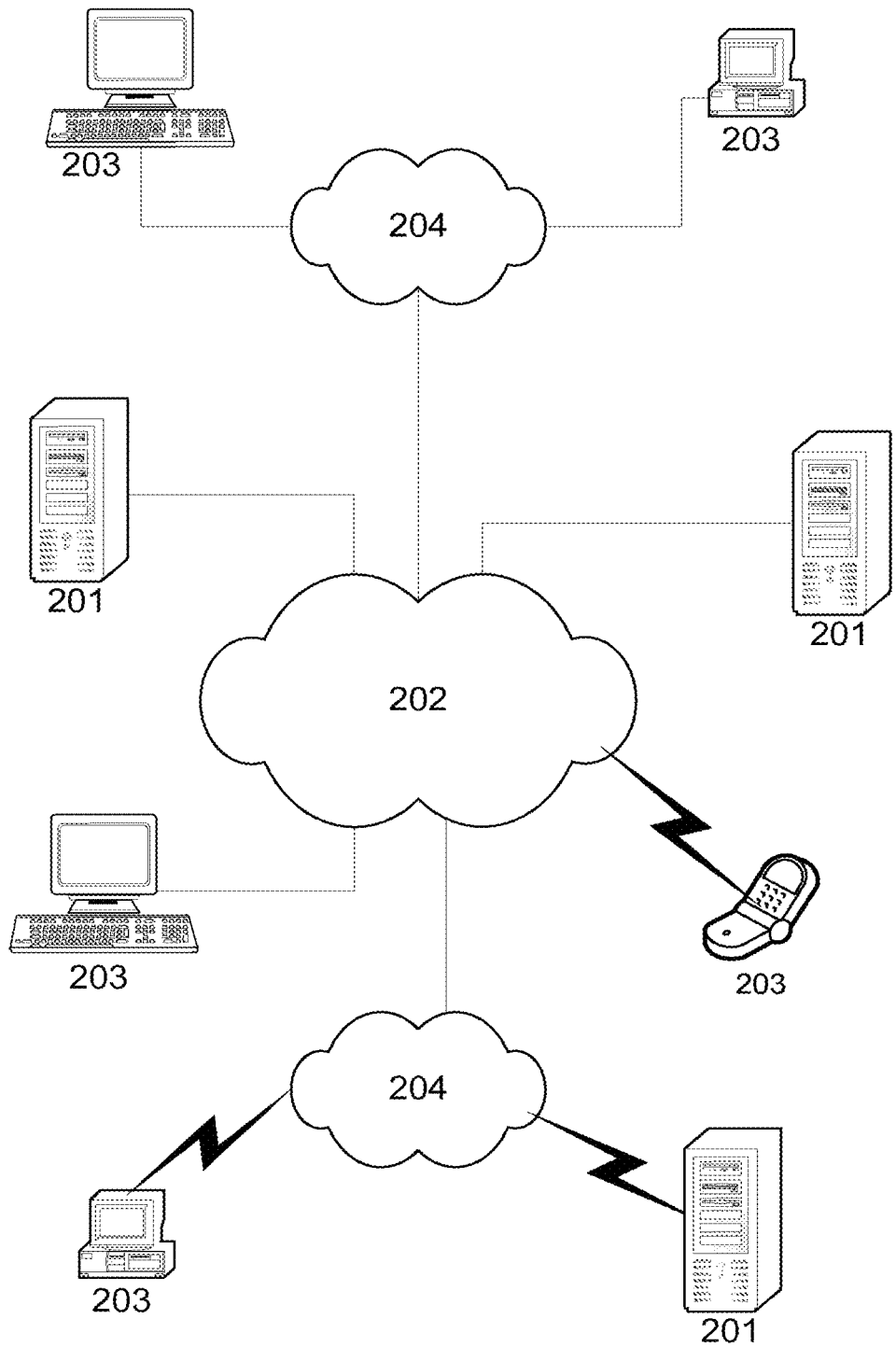
FIG. 2 is a schematic diagram of an example of a distributed computer architecture.

In one example, the processes can be performed at least in part using a processing system, such as a suitably programmed computer system. This can be performed on a stand alone computer, with the microprocessor executing applications software allowing the above described method to be performed. Alternatively, the process can be performed by one or more processing systems operating as part of a distributed architecture, an example of which will now be described with reference to FIG. 2.

In this example, two base stations 201 are coupled via a communications network, such as the Internet 202, and/or a number of local area networks (LANs) 204, to a number of computer systems 203. It will be appreciated that the configuration of the networks 202, 204 are for the purpose of example only, and in practice the base station 201, computer systems 203 can communicate via any appropriate mechanism, such as via wired or wireless connections, including, but not limited to mobile networks, private networks, such as an 802.11 networks, the Internet, LANs, WANs, or the like, as well as via direct or point-to-point connections, such as Bluetooth, or the like.

In one example, each base station 201 includes a processing system 210 coupled to a database 211. The base station 201 is adapted to be used in generating an ontology index and/or mapping content in the database using an ontology index, for example to extract content from or transferring content to the database. The computer systems 203 can be adapted to communicate with the base stations 201 to allow extraction and/or transfer of content instances to be controlled, although this is not essential, and the process can be controlled directly via the base stations 201.

Whilst each base station 201 is a shown as a single entity, it will be appreciated that the base station 201 can be distributed over a number of geographically separate locations, for example by using processing systems 210 and/or databases 211 that are provided as part of a cloud based environment.

However, the above described arrangement is not essential and other suitable configurations could be used. For example, the processes could be performed on a stand alone computer system.

Figure 3:
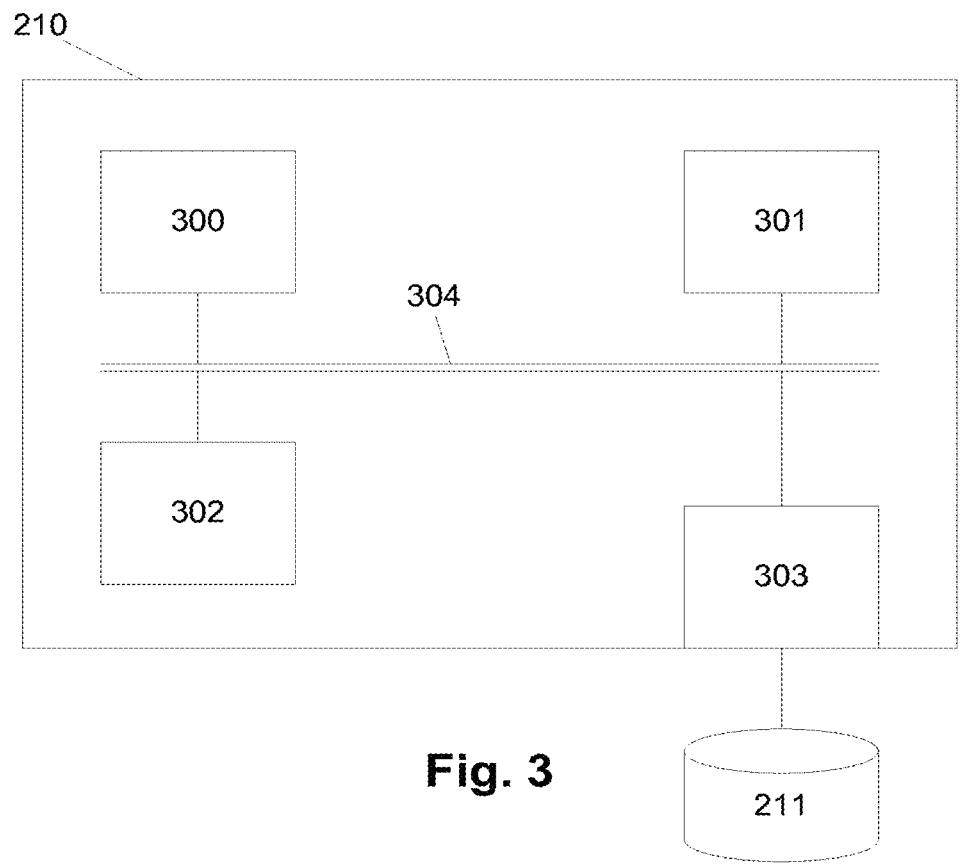
FIG. 3 is a schematic diagram of an example of a base station processing system.

An example of a suitable processing system 210 is shown in FIG. 3. In this example, the processing system 210 includes at least one microprocessor 300, a memory 301, an input/output device 302, such as a keyboard and/or display, and an external interface 303, interconnected via a bus 304 as shown. In this example the external interface 303 can be utilised for connecting the processing system 210 to peripheral devices, such as the communications networks 202, 204, databases 211, other storage devices, or the like. Although a single external interface 303 is shown, this is for the purpose of example only, and in practice multiple interfaces using various methods (e.g. Ethernet, serial, USB, wireless or the like) may be provided.

In use, the microprocessor 300 executes instructions in the form of applications software stored in the memory 301 to allow index generation, mapping and content transfer to/from the database 211 to be performed, as well as to communicate with the computer systems 203. The applications software may include one or more software modules, and may be executed in a suitable execution environment, such as an operating system environment, or the like.

Accordingly, it will be appreciated that the processing system 210 may be formed from any suitable processing system, such as a suitably programmed computer system, PC, database server executing DBMS, web server, network server, or the like. In one particular example, the processing system 210 is a standard processing system such as a 32-bit or 64-bit Intel Architecture based processing system, which executes software applications stored on non-volatile (e.g., hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), or any other electronic device, system or arrangement.

Figure 4:
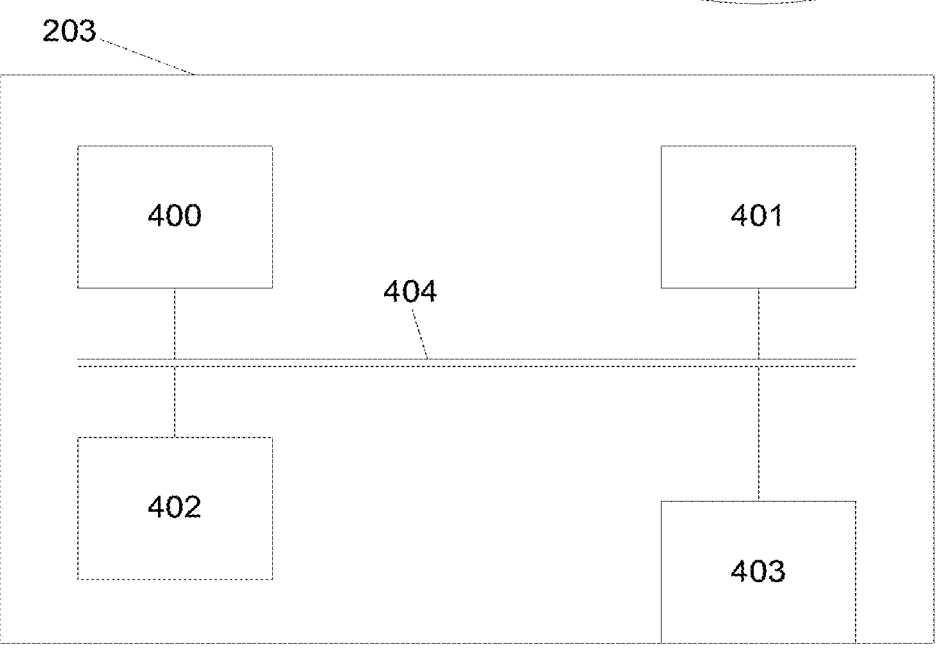
FIG. 4 is a schematic diagram of an example of an computer system.

As shown in FIG. 4, in one example, the computer system 203 includes at least one microprocessor 400, a memory

401, an input/output device 402, such as a keyboard and/or display, and an external interface 403, interconnected via a bus 404 as shown. In this example, the external interface 403 can be utilised for connecting the computer system 203 to peripheral devices, such as the communications networks 202, 204, databases 211, other storage devices, or the like. Although a single external interface 403 is shown, this is for the purpose of example only, and in practice multiple interfaces using various methods (e.g. Ethernet, serial, USB, wireless or the like) may be provided.

In use, the microprocessor 400 executes instructions in the form of applications software stored in the memory 401 to allow communication with the base station 201, for example to allow an operator to provide control inputs.

Accordingly, it will be appreciated that the computer systems 203 may be formed from any suitable processing system, such as a suitably programmed PC, Internet terminal, lap-top, hand-held PC, smart phone, PDA, web server, or the like. Thus, in one example, the processing system 100 is a standard processing system such as a 32-bit or 64-bit Intel Architecture based processing system, which executes software applications stored on non-volatile (e.g., hard disk) storage, although this is not essential. However, it will also be understood that the computer systems 203 can be any electronic processing device such as a microprocessor, microchip processor, logic gate configuration, firmware optionally associated with implementing logic such as an FPGA (Field Programmable Gate Array), or any other electronic device, system or arrangement.

Examples of the index generation and content mapping processes will now be described in further detail. For the purpose of these examples, it is assumed that the processing system 210 of the base station 201 hosts applications software for performing the processes, with actions performed by the processing system 210 being performed by the processor 300 in accordance with instructions stored as applications software in the memory 301 and/or input commands received from a user via the I/O device 302, or commands received from the computer system 203.

It will also be assumed that the user interacts with applications software executed by the processing system 210 via a GUI, or the like, presented either on the input/output device 302 or the computer system 203. Actions performed by the computer system 203 are performed by the processor 400 in accordance with instructions stored as applications software in the memory 401 and/or input commands received from a user via the I/O device 402. The base station 201 is typically a server which communicates with the computer system 203 via the particular network infrastructure available.

However, it will be appreciated that the above described configuration assumed for the purpose of the following examples is not essential, and numerous other configurations may be used. It will also be appreciated that the partitioning of functionality between the computer system 203, and the base station 201 may vary, depending on the particular implementation.

Figure 5:
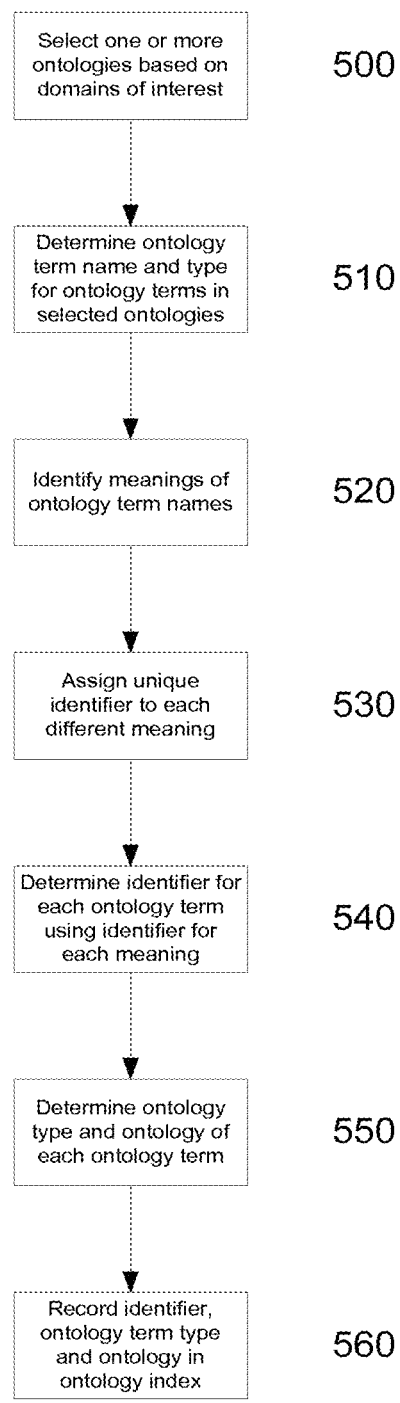
FIG. 5 is a flow chart of a second example of a method of generating an ontology index for use in mapping content fields to ontology terms from one or more ontologies.

An example of the process of generating an ontology index for mapping content fields to ontology terms will now be described in more detail with reference to FIG. 5.

In this example the processing system 210 is used to select one or more ontologies based on domains of interest. This process will typically be performed manually with the operator utilizing their knowledge of the subject matter to which a relevant industry relates and then selecting ontologies whose domains intersect with this subject matter area. The method of selection can vary depending upon the preferred implementation and may include for example having the processing system 210 display lists of available ontologies to the user allowing the user to browse the ontologies and select those which are potentially useful.

At step 510 the processing system 210 determines an ontology term name for ontology terms in the selected ontologies. In particular, this approach typically involves having the processing system 210 mine each ontology and extract a list of every ontology term that is a class or property of the ontology. This is typically in the form of a name pair list of the name-value of every class and class property and their type (class or property) in each of the ontologies. This list is sorted into a name-value sequence and an ontology identifier is appended to each pair.

At step 520 each ontology term is examined to identify meanings of the ontology term names. The meaning is a free qualified meaning ascertained based on one or more of the ontology term name, the ontology term definition or keywords associated with the ontology term.

In this regard, in order to adequately understand the meaning of content in different schemas and ontologies, so it is necessary to identify terms that:
a) Are synonyms—named differently in different ontologies or schemas (e.g. client name, customer name, involved party). Examples include:
  singular or plural (colour, colours)
  a regional spelling (colour, color)
  a regional name (petrol, gas)
  a different nomenclenture e.g. 1, 2, 3 . . . January, February, March . . . .
b) Are homonyms (homograph or homophone)—the same name but different meaning (e.g. right the opposite of left, or right the opposite of wrong).
c) Consist of a subset of a larger class or of the desired class (e.g. voters, drivers, passport holders, citizens).
d) Can be expressed in different units (e.g. mile, kilometre or dmy, mdy).
e) Can be a single datum, a name pair or a metadata tagged item (e.g. 3.14159, pi:3.14159, <mathematical Constant><value/3.1159><name>/pi> </mathematical constant>).
f) Can be a class in one ontology and a property in another. (Person(Name, Home Address) vs. Person (Name), Address(home, work . . . ).
g) Can be of a different type e.g. string(123) integer(123).
h) Can be in multiple versions e.g. 3.1, 3.1.1, 4.0.
i) Can be redefined meaning e.g. Asperger's is now 0.2 on the Autism scale
j) Can be a redefined value as on Cobol.
k) Can be formed by sub-stringing or concatenating fields.
l) Can be formed by a mathematical relationship between one or more fields in the same record.
m) Can be formed by a mathematical relationship between one or more fields across multiple records.

It will be appreciated that technologies exist for identifying such relationships, such as synonym matching techniques, and that these will not therefore be described in further detail.

At step 530 the processing system 210 assigns a unique identifier (NVK) to each different meaning. It will therefore be appreciated that the nature of the identifier is not important but this typically is in the form of an alpha-numeric string or code which is unique to each different meaning.

At step 540 the processing system 210 determines the identifier for each ontology term using the identifier for each meaning. Thus, it will be appreciated that index terms having associated ontology terms with common meanings are assigned common identifiers. This leads to a list including the ontology term name, the corresponding NVK (index term) and associated meaning. An example of this is for illustrative data for healthcare is shown in Table 1 below.

TABLE 1

| Name | NVK | Fully qualified meaning |
| --- | --- | --- |
| Right | 1 | Not left |
| Right | 2 | Not wrong |
| Client name | 3 | Patient |
| Customer name | 3 | Patient |
| Involved Party | 3 | Patient |
| Date dmy | 4 | Date |
| Date mdy | 4 | Date |
| Colour | 5 | Colour |
| Color | 5 | Colour |
| Colors | 5 | Colour |
| Colours | 5 | Colour |
| Aspbergers | 6 | 0.2 Autism |
| Autism | 6 | 0.6 Autism |

At step 550 the processing system 210 determines the ontology type (p=property, c=class) and ontology of each ontology term and then records this together with the identifier as a part of the ontology index. An example of an ontology index is set out below in Table 2.

TABLE 2

| NVK | Type | Ontology |
| --- | --- | --- |
| 1 | P | 1 |
| 1 | P | 2 |
| 1 | P | 3 |
| 2 | P | 4 |
| 2 | P | 5 |
| 3 | P | 6 |
| 3 | C | 1 |
| 3 | P | 2 |
| 4 | P | 2 |
| 4 | P | 6 |
| 4 | P | 7 |
| 5 | P | 6 |
| 5 | P | 5 |
| 6 | P | 6 |
| 6 | P | 7 |
| 6 | P | 5 |
| 6 | C | 8 |
| 6 | C | 1 |

The index is a keyword extract (represented by an identifier in the form of the NVK) from a collection of ontologies, with each index term identifying the ontology and type of the associated ontology term. This allows the index to be used to determine which, if any, of the indexed ontologies could match either the target or source content fields. Once a list of ontologies which potentially describe the data which has been determined, further analysis is possible using various ranking techniques to determine which ontology or set of ontologies best describe the data, and hence which ontology terms should be used.

Figure 6:
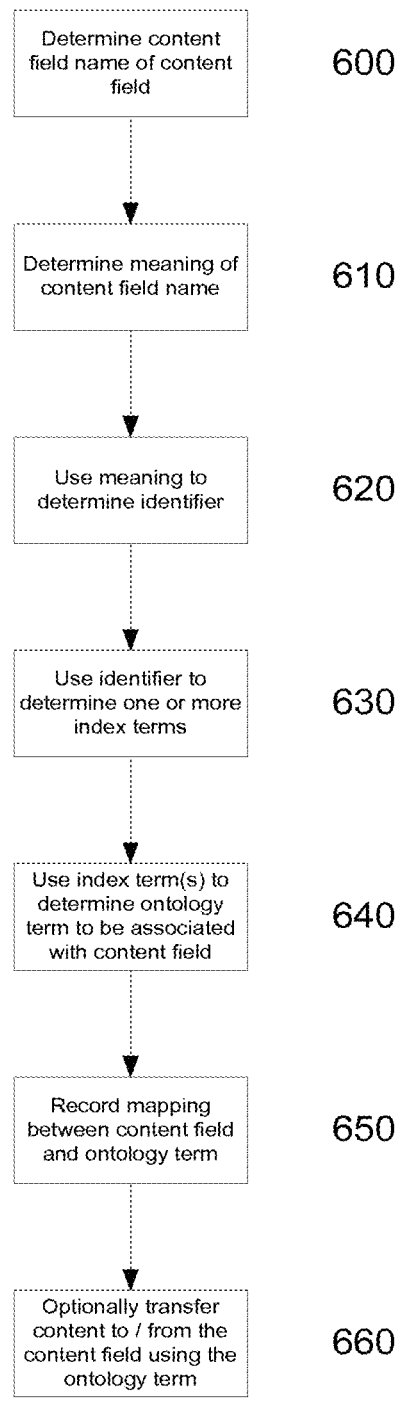
FIG. 6 is a flow chart of a second example of a method of using an ontology index for mapping content fields to ontology terms from one or more ontologies; and, FIG. 7 is a flow chart of an example of a method of selecting an ontology term associated with a content field.

An example of the process for using the ontology index in performing a mapping will now be described with reference to FIG. 6.

In this example, at step 600 the processing system 210 determines a content field name of each content field containing content that is to be mapped to an ontology term. This may achieved in any suitable manner that typically involves having the processing system 210 access database metadata, a file document type definition or the like which includes a list of content field names.

At step 610 a meaning of each content field name is determined. The meaning is a free qualified meaning and this is typically achieved by analysing the content field names and then accounting for synonyms, homonyms etc in a manner similar to that described above. It will be appreciated by persons skilled in the art that this can be achieved utilizing known controlled vocabulary mapping techniques. It will also be appreciated that in the event that there are ambiguities over the meaning of the content field names, this can be displayed to an operator allowing the operator to resolve the ambiguity, for example by providing a definition meeting the formal controlled vocabulary requirements.

At step 620 the processing system 210 uses the meaning to determine the identifier (NVK) corresponding to the respective meaning.

At step 630 the processing system 210 utilizes the identifier to determine one or more relevant index terms. In general, it is typical for multiple index terms to be relevant, particularly when multiple ontologies are used. Thus, it will be appreciated that ontological terms across multiple ontologies can have the same meaning and accordingly the content field name may map to ontological terms in different ontologies.

Having identified one or more index terms the processing system 210 then operates to select an ontology that is going to be associated with the content field. In the event that only a single index term has been identified, then the ontology term associated with the index field is used. However, if multiple index terms have been identified, then it is typical to select one of the ontology terms based on rules or criteria. This can include for example identifying conflicting situations as will be described in more detail with respect to FIG. 7.

At step 650 the processing system 210 records a mapping between the database field and the ontology term which can then be used in transferring content to or from the ontology field using the ontology term. This process involves generating a store including a store field having a store field name corresponding to the ontology term. The content can then be transferred into the store so that it has an understood meaning in the context of the controlled vocabulary. A mapping can then be used to translate this into another schema or document definition for transfer to a database or file.

The mapping can be extremely sophisticated and can be used to accommodate a range of different scenarios. For example, multiple mappings can be defined, with a respective mapping being used for a given situation. The mapping can also be used to account for missing information, for example by including default values for properties if these are not found. The mapping can be stored as part of a file, such as an XML file containing the data being transferred between a source and target. However, additionally or alternatively, the mapping could be contained in a database, allowing the mapping to be reviewed and manipulated using a graphical user interface or the like.

Thus it will be appreciated that in the above described process, a custom schema for a healthcare database may be parsed to identify the database field names. The ontology index is then used to generate a mapping in which each of the database field names are mapped to a corresponding ontology term, potentially across one or more ontologies. This mapping is then used to extract data from the database, or store data in the database based on the selected ontology term, so that it can later to be transferred to another database, for example having a different healthcare schema.

Figure 7:
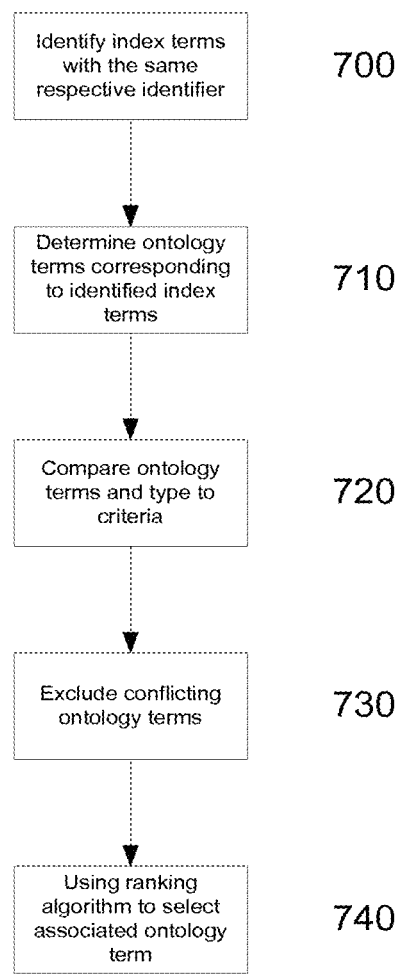

An example of the process of selecting one of a plurality of ontology terms will now be described with reference to FIG. 7.

In this example, step 700 index terms with the same respective identifier are determined. The processing system 210 then operates to determine the ontology terms corresponding to the identified index terms. The ontology terms then compare to predetermined criteria at step 720 allowing conflicting items to be excluded at step 730. Finally, at step 740 a ranking algorithm is used to select an associated ontology term. Factors determining used in determining the ranking can include:

- Percentage of properties which directly match the desired properties (Pp) for a data source or target I using ontology j.
- Percentage of classes which directly match the desired classes (Pc) for a data source or target I using ontology j.
- Various weighting factors based upon the combination of Ppi and Pci for each data source and target i. and ontology j.
- Weighting factors based upon the complexity of the merging and mapping of the various ontologies (j).

A simple example will now be described with respect to the above illustrative data. In this example, content instances corresponding to records relating to individuals that are right handed with autism are to be identified.

Accordingly, this requires that content is extracted from database fields relating to handedness (right), patient name, and autism, which have meanings corresponding to NVKs 1, 3 and 6, respectively. In this example, the relevant index terms are as shown in Table 3 below, which highlights that only ontology "1" would uniquely include relevant ontology terms.

TABLE 3

|     | Right | Name | Autism |   |
| --- | --- | --- | --- | --- |
| NVK | 1 | 3 | 6 |   |
| Ont | 1 | 1 | 1 | c |
| Ont | 2 | 2 | 5 | p |
| Ont | 3 | 6 | 6 | p |
| Ont |   |   | 7 | p |
| Ont |   |   | 8 | C |

In the mapping to the target ontology it may be necessary to map right (yes/no) to handedness (right/left). Because autism is a class we would need further investigation to see how we could store it as a numerical value on the autism spectrum.

It should also be noted that ontology "1" defines autism as a class, whereas it may be necessary for autism to be expressed as a property. In this scenario, ontologies "5", "6", "7" store autism as a property and may therefore be more appropriate than ontology "1". Ynly ontology "6" has the patient name but it does not record the patients handedness. However, the fields can suitably defined by joining ontologies "6" and "1", or "6" and "2" on the patient name. Accordingly, the database fields for "right" could be mapped to ontology "1" or "2", whilst could be mapped to ontology terms Accordingly, the above describes a mechanism for building an ontology index for one or more ontologies allowing the ontology index to be used in mapping content fields to ontology terms, thereby allowing content to be more easily transferred between different sources and targets.

Specific examples of the process of using an ontology index for exporting data from a source database to a file, and from a file to a target database, will now be described in more detail.

For the purpose of these examples, the term "source database" is used to refer to a database from which data is being extracted, whilst the term "target database" is used to refer to a database in which data is being stored. These terms are for the purpose of illustration only, for example to distinguish between the databases, and are not intended to be limiting. Furthermore, the term "content instance" refers to an individual piece of data that is being extracted from and/or transferred to a database, and is also not intended to be limiting.

It is also described that different indexes are used for source and target database, but this is not essential as has been previously described. It is further described that manual definition of index terms can be defined, although generally this is not essential, but may be required if the index doesn't cover all relevant database field types.

As in the previous examples, it is assumed that the process is performed at least in part using an electronic processing device, such as a processor of a computer system. It is also assumed that content instances are stored in a database with each content instance being stored in a respective database field having a database field type. It will therefore be appreciated that this can be applied to a range of different databases such as relational databases or the like.

Figure 8A:
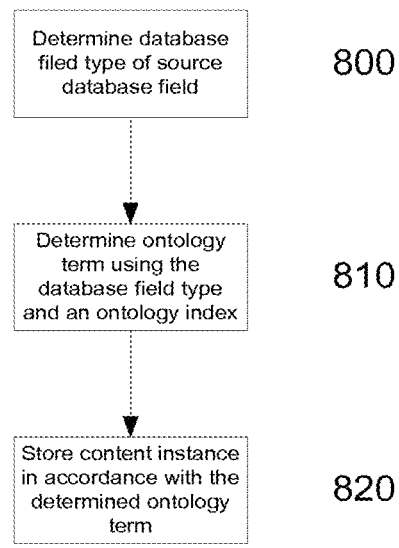
FIG. 8A is a flow chart of an example of a process for extracting content instances from a source database.

An example of a process for extracting content instances from a source database will now be described with reference to FIG. 8A.

In this example, at step 800 an electronic processing device determines the source database field type of a source database field in which a content instance is stored. This may be achieved in any one of a number of ways but will typically involve, at least in part, examining metadata associated with the source database which defines different source database field types.

At step 810, the electronic processing device determines an ontology term associated with the content instance using the source database field type of the source database field, and an ontology index that maps source database field types to respective ontology terms from one or more ontologies.

In this regard, as the ontologies provide unique and agreed upon definitions associated with different types of data used within different subject matter fields. The ontology index provides a mapping between some of the ontology terms of the ontologies and database field types of the source database. It will therefore be appreciated that the ontology index can be database specific, or industry specific for example to allow a single ontology index to provide a mapping for several difference databases.

As part of this process, in one particular example, if an ontology term is not defined for the source database field type then an association can be created between an ontology term and the source database field type manually, allowing this to be added to the ontology index.

At step 820, the electronic processing device stores the content instance in either a file or a store, in accordance with the associated ontology term. This can be achieved in any one of a number of ways and may involve storing the content instance in either a store field or file field having a respective field type based on the ontology term. Accordingly, in one example, the process can be used to transfer content instances to a data store or a file which has a structure based on ontology terms. In one particular example this can be used to transfer data into a file which is a mark-up language file, such as an RDF/XML compliant file, which is a file able to be used to express an RDF graph as an XML document.

In any event, it will be appreciated that the above described process allows content instances to be extracted from a source database and transformed into a structured format that is compliant with an ontology index and hence with one or more ontologies. This makes the data easier to query and interpret, as well as making it easier to subsequently transfer the data, for example to a target database.

Figure 8B:
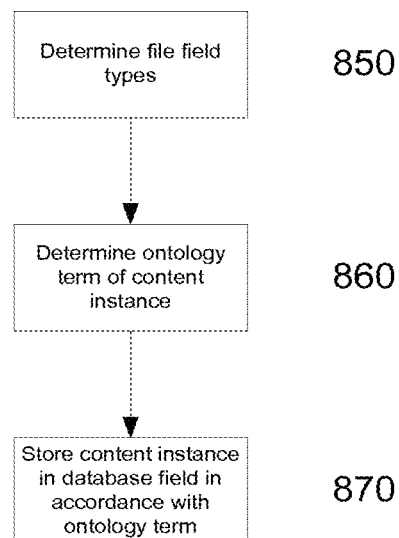
FIG. 8B is a schematic diagram of an example of a process for transferring content instances from a file to a target database.

An example of the process for transferring a content instance from a file to a target database will now be described with reference to FIG. 8B.

It will be appreciated that whilst the following example focuses on transferring data from a file, a similar process can be used to transfer data from a store to a target database, and this will not therefore be described in detail.

In this example, at step 850, the electronic processing device determines an ontology term of a content instance to be transferred, using the file field type of the file field in which the content instance is stored. This can be achieved in any suitable manner, depending on the nature of the file. However, if the file has been created using the process outlined above with respect to FIG. 8A, then the file has file field types corresponding to different ontology terms, in which case the process involves examining metadata associated with the file to determine the file field type of the field containing the content instance, which in turn corresponds to an ontology term.

At step 860, the electronic processing device determines a target database field type corresponding to the ontology term of the content instance. This is achieved by using the ontology term and using a second ontology index that maps the database field types to respective ontology terms. As in the previous example, it will be appreciated that the second ontology index is typically specific to the target database, but alternatively may be the same index if this is applicable to a number of database, as previously described.

At step 870 the electronic processing device stores the content instance in a target database field of the target database in accordance with the determined target database field type.

Thus, it will be appreciated that the above described processes allow data to be extracted from a source database and transferred to a file having a defined file structure. The data can then be subsequently transferred into a target database, which can have a different field structure to the source database. By mapping the database field types to ontology terms, this process effectively normalizes data in the file to a higher NF than it has in the source and target databases, typically $7^{th}$ or $8^{th}$ NF, which removes any ambiguities in the relationships between the data, allowing the data to be accurately and easily transferred between different source and target databases.

A number of further features will now be described.

When data is being extracted from the source database, the data can be stored in a store field of a store which has a store field type determined in accordance with the associated ontology term. Additionally, and/or alternatively, the content instance can be stored in file field of a file having a file field type determined in accordance with the associated ontology term. In one particular example, the content instance is stored in a store field of a store before being transferred into a file field of a file. This has certain advantages, for example by allowing manipulations to be performed on content instances as they are being extracted from the database, such as to allow aggregation, combination, splitting or other manipulations of content instances. This also allows content instances to be managed hierarchically as will be described in more detail below.

Similarly, when content instances are being transferred from a file to a target database, content instances are again stored in a store field of a store before being transferred into a file field of a file allowing manipulations to be performed in a similar manner.

The processes can be performed on each content instance individually. More typically however multiple content instances are extracted and transferred during any one particular process, for example by having the electronic processing device determine a number of content instances to be extracted and then create store fields in a store in accordance with the determined number. This is generally performed on each content instance to be extracted, having each content instance extracted, stored in the store, and then subsequently transferred to the file. This assist in performing manipulations or the like.

When extracting content instances from a source database, the electronic processing device typically determines each of the source database field type from source database metadata defining the source database field types. These can then be compared to the ontology index to determine an ontology term associated with each source database field type. It will be appreciated that in this regard, reference to each source database field type does not necessarily mean all database filed types of the source database, but those for which content instances are to be extracted.

In contrast, when transferring content instances to a target database, the electronic processing device determines the ontology terms associated with each of the content instances to be transferred, and then determines the required target database field types using the second ontology index, which as described above could be the same as the first ontology index.

In order to identify an ontology index that can be used, it is possible to examine a plurality of existing ontology indexes, stored for example in an ontology index repository. In one example, this involves comparing source database field types to database field types in the plurality of ontology indexes and then selecting an ontology index based on the results of the comparison. Similarly, for transferring content instances to a target database, the electronic processing device typically compares target database field types to database field types in a plurality of ontology indexes and then selects a second ontology index based on the results of the comparison. However, alternatively the index can be selected using other techniques, such as based on the subject matter of the content to be transferred.

Whilst reference is made to use of a single ontology, it will be appreciated that some databases may include data spanning many different subject matter fields, in which case the content instances could be associated with ontology terms spanning multiple ontologies. In this instance, the ontology index can simply map the database field types to ontology terms in different ontologies, as will be appreciated by persons skilled in the art.

For any source database field types not having an associated ontology term, these can then be determined manually by having the electronic processing device display an indication of the source or target database field type and a plurality of ontology terms to a user. This allows the user to select a relevant ontology term so that the electronic processing device can determine an association between an ontology term and a source or target database field type in accordance with user input commands. This information can then be used to update the first or second ontology index. Thus it will be appreciated that this allows the index associated with a given database to be gradually extended as required, so that the index can contain only minimal entries, thereby limiting processing requirements by avoiding the need to consider irrelevant ontology terms.

In one particular example, content instances are extracted in a hierarchical fashion by retrieving content instances for a parent node from the source database field, storing these in a store field and then retrieving content instances for each child node of the parent node with these being stored in respective store fields. These can then be transferred to files as required. A similar process can be used for transferring content instances from a file to a database.

Processing the data hierarchically can ensure the relationships between the content instances are maintained, as well as allowing content instances to be more easily mapped to associated ontology terms and manipulated, for example by grouping or splitting related content instances.

In one example, content instances to be extracted from the database are determined using a query. In this regard, a query can be applied to the source database allowing a report to be returned from the source database. The report will typically allow the electronic processing device to determine a number of content instances in the report and then create store fields in the store on that basis. Content instances can then be transferred from the report to the store fields in the store with any associated manipulations being performed as required. Similarly, content instances can be stored in a target database using queries. It will be appreciated that in this example the queries can be of any appropriate form but typically include SQL (Structured Query Language) queries, or the like.

As in the previous example, the processes can be performed at least in part using a processing system, such as a suitably programmed computer system, which can be either a stand alone computer or a computer within a networked environment, similar to that described above with respect to FIGS. 2 to 4.

Figure 9:
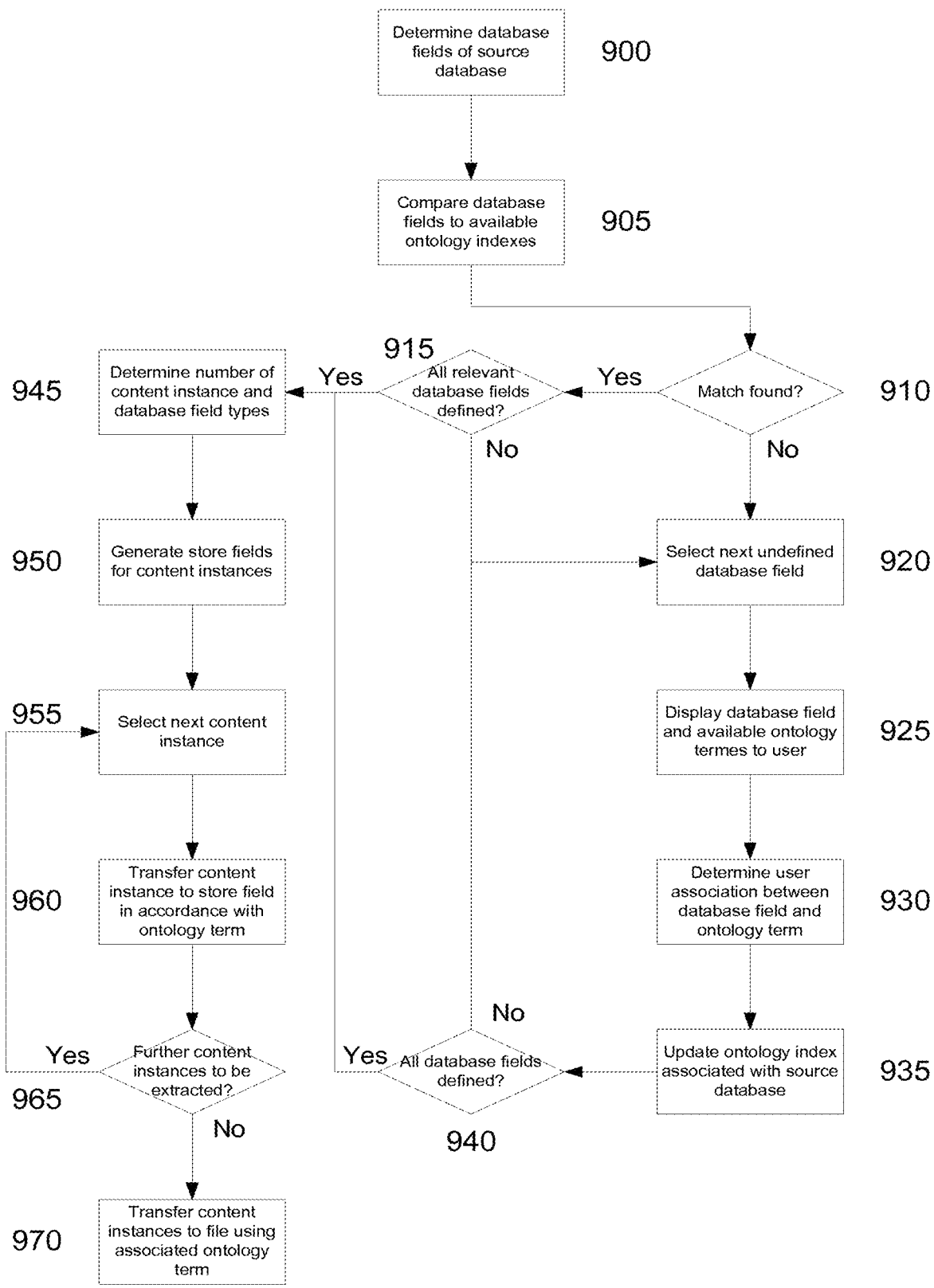
FIG. 9 is a flow chart of a second example of a process for extracting content instances from a source database; and, FIG. 10 is a flow chart of a second example of a process for transferring content from a file to a target database.

An example of the process for extracting content instances from a source database will now be described with reference to FIG. 9. In this example, reference will be made to the transfer of medical record information from an HL7 (Health Level Seven standard for Healthcare Data Interchange) 2.7 compliant database that stores patient medical records, although it will be appreciated that this is for the purpose of illustration only, and the techniques can be applied to any data within any industry.

In this example, at step 900 the processing system 210 determines database fields of the source database. Typically this involves applying a query to the source database, such as a query which will return a report containing content instances of interest. For example, this could involve querying the database to determine patient records relating to a plurality of individuals, such as patients of a medical institute. In this example, the content instances are typically arranged hierarchically, with the parent node representing a respective individual, and child nodes representing information associated with the individual, such as details of diagnoses, procedures, treatments, or the like. The data returned from the database typically includes metadata defining the relevant database field types used within the relevant medical records, although alternatively this information can be determined using other techniques, as will be appreciated by persons skilled in the art.

At step 905 the processing system 210 compares the source database field types of the source database fields in which the content instances are stored to available ontology indexes. In particular, the processing system 210 will examine each of a plurality of existing ontology indexes to see if they include database field types corresponding to the source database field types. It will be appreciated that in this instance, as it is known that the data relates to medical records, the processing system 210 will typically access ontology indexes that relate to a medical ontology, thereby limiting the number of ontology indexes that need to be reviewed.

If a match is found at step 910, the processing system 210 moves on to step 915 to determine if all relevant source database field types are defined in the ontology index. In the event that no match is found, or not all database field types are defined, at step 920 the processing system 210 selects a next source database field type that is not defined in the ontology index, and displays an indication of this and various available ontology terms to a user at step 925. This process may be achieved in any manner but typically involves allowing the user to select or search for relevant ontology terms, for example by displaying categories of ontology term to the user, which the user can then browse.

Once the user has found an ontology term that correctly defines the relevant source database field type, the user uses input commands to indicate a match, allowing the processing system 210 to define an association between the source database field type and ontology term at step 930. The processing system 210 will then update the ontology index associated with the source database at step 935 and determine if all relevant source database field types have been defined at step 940. If not the process returns to step 920 allowing a next undefined source database field type to be selected.

Accordingly, this process allows the ontology index associated with the source database to be updated on a discovery basis. Thus, for example, if a patient record contains an entry that is not in the ontology index it can be added to the index by browsing the medical ontology and manually defining required associations.

Once all relevant database field types have been defined, at step 945 the processing system 210 determines the number of content instances and their associated database field types at step 945. The processing system 210 then generates store fields in a store for each of the content instances. The store fields are generated in accordance with the ontology term associated with the content instance to be stored therein, so that the store fields have a store field type associated with the ontology term. This is achieved by generating the store fields using the source database field type of the source database field containing the content instance, and the mapping defined in the ontology index.

Having created the store fields at step 955, the processing system 210 selects a next content instance and transfers this into the store field in accordance with the ontology term. Thus, for example, if the particular content instance relates a procedure undergone by the patient, this process involves creating a store field having a store field type associated with the ontology term defining the procedure, and then storing the content instance in that store field.

The processing system 210 then determines if further content instances are to be extracted at step 965 and if so returns to step 955 allowing a next content instance to be extracted. This process is then repeated until all relevant content instances are stored in the store. Thus, the content instances can be stored in the report and transferred from the report into the store in accordance with the ontology term ensuring that the content instance is stored within a store field having a store field type corresponding to the ontology term.

This process may be performed hierarchically as previously described so that content instances for a parent node and each associated child node are transferred in sequence. Thus, in the medical records example, each parent node will typically correspond to the medical record of a respective patient, with child nodes corresponding to information associated with the individual, such as identifying information, details of procedures, treatments, or the like. By transferring all content instances of parent and corresponding child nodes, this allows each medical record to be transferred in turn, thereby ensuring each medical record can be extracted in it's entirety and without risk of this being contaminated with data from other medical records.

This also allows manipulation of the content instances associated with a respective medical record to be performed, for example to allow content instances to be split or combined, which may be required if there is a many to one or one to many relationship between the source database field types and ontology terms. Thus, for example, a database field corresponding to a full name, may map to ontology terms relating to first and second names, in which case the content instance corresponding to the patient name will need to be split and stored within two store fields, one corresponding to the first name and one to the last name. By storing all content instances to be extracted this allows the manipulation to be performed on all the content instances together.

Once all content instances are stored in the store the content instances can be transferred to a file using the associated ontology term. In particular, the content instances can be stored in an RDF/XML file having a schema based on the ontology terms of the respective content instances. Thus, the tags of the mark-up language file typically correspond to the ontology terms, so that each content instance in a respective store field, can be transferred directly to a corresponding file field.

It will also be appreciated however that the store fields could be defined in accordance with the database field types as opposed to the ontology terms, in which case manipulation of data may occur as content instances are transferred to the file as opposed to during transfer between the source database and the store.

In any event, the above described process provides a mechanism for allowing data to be extracted from databases and stored in RDFS compliant XML files with each content instance being associated with respect of ontology term. Thus the nature of the data in the file is defined with respect to the relevant data ontology, in effect normalising the data, and thereby allowing the data to be more easily mapped to other databases as will now be described with reference to FIG. 10.

In this example at step 1000, the processing system 210 determines database field types of a target database. In particular the processing system 210 will examine metadata of the target database to determine database field types used by the target database. These database fields are then compared to available ontology indexes at step 1005, allowing the processing system 210 to determine if a match is found at step 1010. It will be appreciated that this process is broadly similar to the process described above with respect to FIG. 9.

If a match is found, at step 1015, the processing system 210 determines if all required target database field types are defined. In this regard, it will be appreciated that required database field types will only correspond to target database field types into which content instances are stored.

Accordingly, once a relevant ontology index has been identified, the processing system 210 will examine the ontology terms of the content instances in the file, for example by examining metadata of the file, such as a document definition that defines the tags used in the mark-up language files. The processing system 210 then determines if database field types are defined for each of the respective ontology terms in the ontology index.

If not all ontology terms are associated with target database field types, then at step 1020 the processing system 210 selects a next undefined ontology term and displays an indication of this and the target database field types to the user at step 1025. This allows the user to define an association between a target database field type and a corresponding ontology term at step 1030, with this then being added to the ontology index associated with the target database, by the processing system 210, at step 1035.

At step 1040 it is determined if all ontology terms are related to target database field types and if not the process returns to step 1020 allowing a next ontology term to be defined.

Once all relevant ontology terms are mapped to target database field types, at step 1045 the processing system 210 determines a number of content instances and the associated ontology terms of the content instances from the file. At step 1050, the processing system 210 generates store fields for each of the content instances, the store fields having a store field type associated with the corresponding ontology term of the content instance to be stored therein.

At step 1055 the processing system 210 selects a next content instance and then transfers this to the store field in accordance with the ontology term. The processing system 210 determines if further content instances are to be transferred at step 1060 and if so returns to step 1055. Again, it will be appreciated that this allows content instances to be manipulated, as required, and as optionally defined in the ontology index, for example by a many-to-one association between ontology terms and one or more database field types.

Otherwise, once all the content instances are stored in the file these are transferred to the target database using the associated ontology term and the ontology index to map the content instances into target database fields having a respective target database field type.

Figure 10:
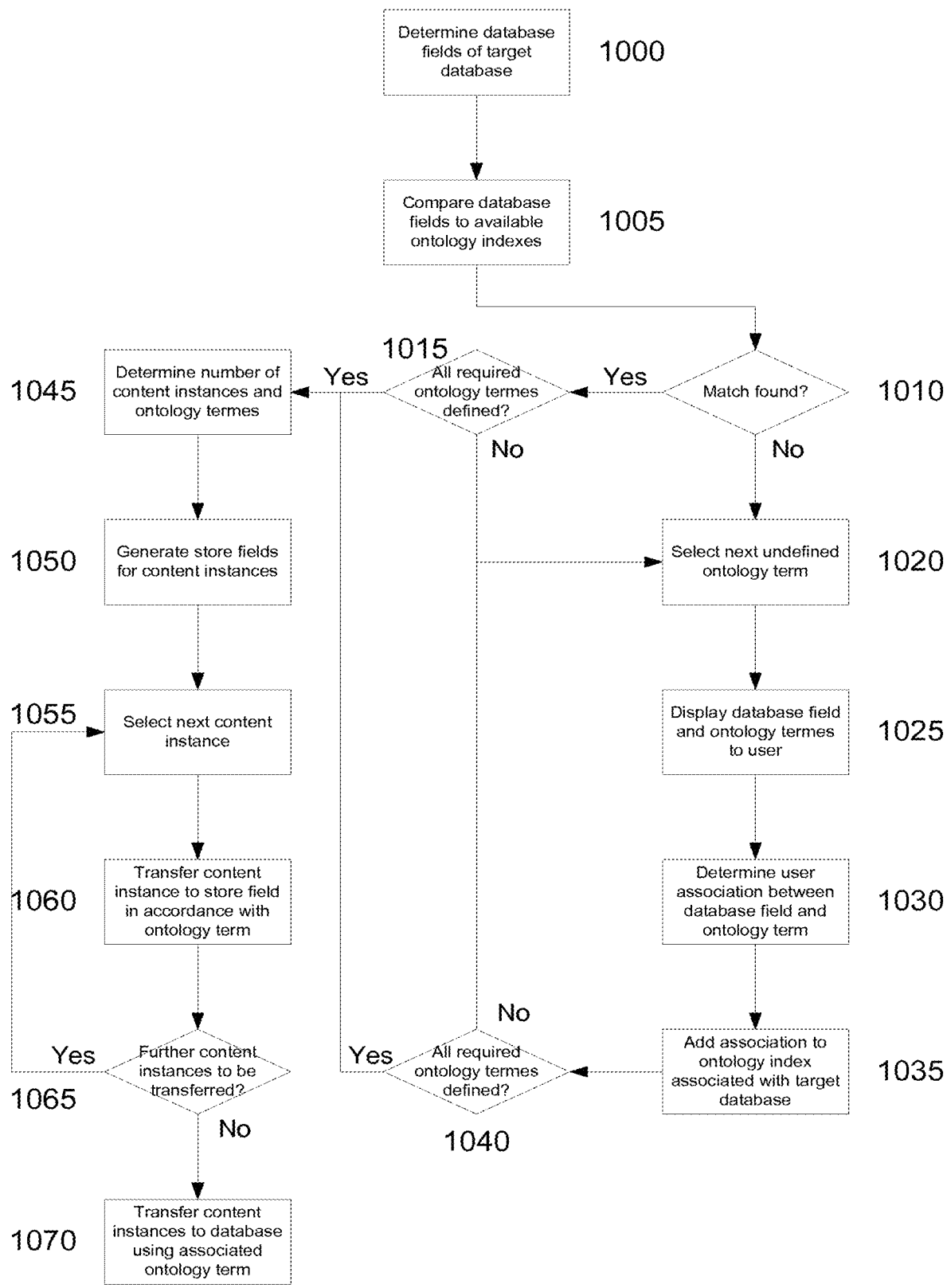

Thus, it will be appreciated that in the example of FIG. 10, the target database can have a different structure, and in one example, a different schema such as a different HL7 compliant schema, to the source database. This process therefore allows data, such as medical records, to be extracted from a source database and mapped to respective ontology terms, before being transferred to a target database having a different schema. During this process, conversion to the ontology terms allows the data to be automatically normalised in accordance with the ontology, thereby improving the accuracy with which the data can be transferred to another database. Despite that, the use of the ontology index, avoids the need to associate database fields with the entire ontology, thereby eliminating irrelevant ontology terms, such as the scientific research side of ontologies which comprise over 99% of the ontological definitions. This in turn vastly reduces the complexity of the data transfer process.

A further benefit of the above described arrangements is that the ontology indexes will typically have a hierarchical structure. Accordingly, in one example, once a relevant ontology index has been identified relating to a particular database, the structure and/or detail of the index can be displayed to a user, allowing the user to perform database searches based on the ontology index. In particular, this allows user to query databases that have an unfamiliar schema, by allowing the user to structure the search using ontology terms, whose meaning is well defined.

Following this, the search query can be translated into a database query, using the index to map ontology terms in the query into respective database field types, so that the query can be interpreted by the relevant DBMS. Furthermore, by applying scoping parameters to the hierarchy the application can automatically build an efficient RDF query or set of queries, which will discover only the requested records. This in turn allows users to easily interact with familiar datasets.

Similarly, the use of ontology indexes allows queries formulated for one database to be normalised to ontology terms and then reformulated for a different database. Thus, if a user of a first database needs to retrieve data from a second database having a different and unfamiliar schema, the user can formulate a query for the first database. The query can then be reformulated based on ontology terms using an ontology index associated with the first database, and then converted into a format suitable for querying the second database, using an ontology index associated with the second database.

Accordingly, the above described processes can be used to provide automated recognition of source data structures, automated recognition of target data structures and automated mapping between source and target data.

Furthermore, whilst the above examples have focussed on the use of existing ontology indexes and a manual process of extending these as required, this is not essential and additionally or alternatively, indexes can be generated through automated procedures. For example, the process can involve examining samples of the source or target data at the field level, and then using metadata regarding the database field types to interpret the meaning of the field, and hence automatically define mappings to ontology terms.

In the case of loosely structured data, such as medical records, there is therefore the potential to allow this to analyse data contained in various database structures, and allow the data to be translated into an ontology based structure, allowing records from different heath service providers or the like to be compared and/or integrated, thereby helping overcome the significant problems associated with the current healthcare records system.

It will be appreciated that the processes of FIGS. 6 to 10 can be used in conjunction with the methods of FIGS. 1A, 1B and 5 to 7.

It will be appreciated that the above described processes provide for the ability to generate and use an index that avoids the need to deal with the extreme complexity of ontologies, ignoring the semantic content in order to see if the ontology is relevant to the content being transferred. In particular, the actual data mapping using the ontology can be considered as a two stage process. The first stage will be via use of the index, the second stage would be to apply standard ontology mapping created from the first stage by applying the semantic of the ontology. Thus the effort in applying the semantics is limited to only that portion of the data of interest as identified by the index. This can result in a reduction of effort of between 90% and 99.999%, depending on the number and size of ontologies involved.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The claims defining the invention are as follows:

1. A method of using an ontology index for mapping content fields to ontology terms from one or more ontologies, the method including, in an electronic processing device:
   a) determining a content field name of a content field;
   b) selecting at least one index term from the ontology index at least partially in accordance with the content field name; wherein the ontology index includes index terms indicative of the ontology terms from multiple different ontologies;
   c) using the at least one index term to create a mapping to map the content field to an associated ontology term;
   d) determining a plurality of ontology terms using the at least one index term; and
   e) selecting the associated ontology term from the plurality of ontology terms using a ranking process, wherein the ranking process includes:
      (1) determining a percentage of ontology terms that match the content field; and,
      (2) weighting factors.

2. A method according to claim 1, wherein the method includes, in an electronic processing device:
   a) determining a plurality of ontology terms associated with a number of related content fields; and,
   b) excluding ontology terms that cannot be used to relate the content fields.

3. A method according to claim 1, wherein the method includes, in an electronic processing device, selecting the associated ontology term to preserve relationships between the content fields.

4. A method according to claim 1, wherein each index term includes:
   a) an identifier indicative of the meaning of the respective ontology term;
   b) an indication of the ontology containing the respective ontology term; and,
   c) an indication of an ontology term type of the respective ontology term.

5. A method according to claim 4, wherein each ontology term has an ontology term type, the ontology term type being at least one of an ontology class and an ontology property.

6. A method according to claim 1, wherein the method includes, in an electronic processing device, selecting one of a plurality of ontology indexes in accordance with a subject matter of the content.

7. A method according to claim 1, wherein the content fields are at least one of database fields and file fields.

8. A method according to claim 1, wherein the method includes, in an electronic processing device, at least one of:
   a) transferring content to a target using the mapping;
   b) transferring content from a source using the mapping; and,
   c) transferring content from a source to a target using the mapping, and wherein at least one of:
      i) the source is at least one of a database and a file; and,
      ii) the target is at least one of a database and a file.

9. A method according to claim 1, wherein the method includes, in an electronic processing device, transferring content associated with the content field at least partially in accordance with the associated ontology term.

10. A method according to claim 9, wherein the method includes, in an electronic processing device, storing the content in a store field of a store, wherein the store field has a store field determined in accordance with the associated ontology term.

11. A method according to claim 10, wherein the method includes, in an electronic processing device, creating the store in a memory of a processing system.

12. A method according to claim 9, wherein the method includes, in an electronic processing device:
   a) determining an ontology term associated with each of a number of content instances to be transferred to a target;
   b) storing each of the content instances in the store fields of the store in accordance with the ontology term; and,
   c) transferring each of the content instance to target content fields in the target using the ontology term and the ontology index.

13. A method according to claim 9, wherein the method includes, in an electronic processing device:
   a) determining an ontology term associated with each of a number of content instances to be transferred from a source; and,
   b) storing each of the content instances in the store fields of the store in accordance with the ontology term and the ontology index.

14. A method according to claim 1, wherein the method includes, in an electronic processing device:
   a) determining a content field meaning associated with the content field name; and,
   b) determining a respective identifier using the content field meaning; and,
   c) selecting at least one index term using the respective identifier.

15. A method according to claim 14, wherein each index term is associated with a corresponding ontology term and index terms having corresponding ontology terms with equivalent meanings are assigned the same identifier, wherein the method includes, in an electronic processing device:
   a) determining each index item having the respective identifier; and,
   b) determining the ontology terms using each index item.

16. A method according to claim 14, wherein at least some index terms have the same respective identifier.

17. Apparatus for using an ontology index for mapping content fields to ontology terms from one or more ontologies, the apparatus including a processing system having an electronic processing device that:
   a) determines a content field name of a content field;
   b) selects at least one index term from the ontology index at least partially in accordance with the content field name, wherein the ontology index includes index terms indicative of the ontology terms from multiple different ontologies;
   c) uses the at least one index term to create a mapping to map the content field to an associated ontology term;
   d) determining a plurality of ontology terms using the at least one index term; and
   e) selecting the associated ontology term from the plurality of ontology terms using a ranking process, wherein the ranking process includes:
      (1) determining a percentage of ontology terms that match the content field; and,
      (2) weighting factors.

\* \* \* \* \*